July 24, 1951      M. SINNER      2,561,757

SWIVEL PIPE COUPLING

Filed June 23, 1949

Inventor

Martin Sinner

By *Clarence A. O'Brien and Harvey B. Jacobson*
Attorneys

Patented July 24, 1951

2,561,757

UNITED STATES PATENT OFFICE 2,561,757

SWIVEL PIPE COUPLING

Martin Sinner, Spring Valley, Calif.

Application June 23, 1949, Serial No. 100,888

1 Claim. (Cl. 285—97.5)

This invention relates to new and useful improvements and structural refinements in swivel couplings for pipes, and the principal object of the invention is to facilitate leak-proof connection between two pipes or between a pipe and a fitting, one of which is stationary while the other is required to rotate.

In particular, the invention concerns itself with the attachment of a faucet to a stationary pipe, such as for example, a garden hose faucet and the water pipe leading thereto, an important feature of the invention residing in the provision of means to facilitate unrestricted rotation of the faucet on the pipe, so that when a garden hose is connected to the faucet, the hose may be manipulated without any danger of coiling, twisting or winding itself around the pipe of the faucet.

Some of the advantages of the invention reside in its simplicity of construction, in its durability, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
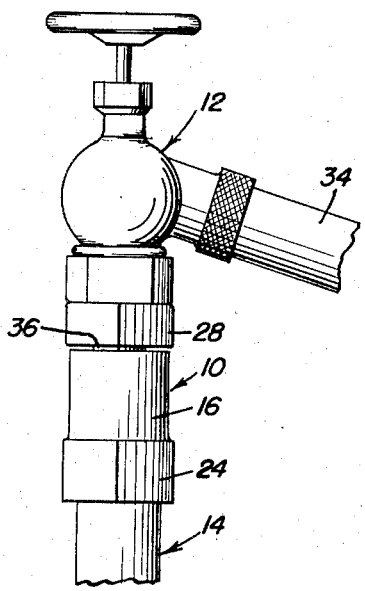
Figure 1 is an elevational view of the invention.

Referring now to the accompanying drawings in detail, the invention consists of a swivel coupling designated generally by the reference character 10, such as may be conveniently employed for connecting a rotatable faucet assembly 12 to a stationary pipe 14. It is to be noted that although the invention is herein described as being associated with a faucet and a pipe, it may be employed with equal expediency for connecting together two pipes or two fittings of any kind, as will be clearly apparent.

In any event, the coupling 10 embodies in its construction a connecting sleeve 16 having a diametrically stepped bore to provide what may be referred to as a large end 18, a small end 20 and an annular shoulder 22 therebetween, the large end portion of this sleeve preferably being provided with an external, polygonal head 24 so that a wrench, or the like, may be applied thereto.

A substantially tubular connecting member 26 has one end portion thereof rotatable in the small bore 20 of the sleeve 16, the member 26 projecting outwardly from the sleeve and being provided on its projecting portion with a polygonal wrench-receiving head 28 and with an externally screw-threaded adapter portion 30 whereby it may be connected to the conventional faucet 12, as will be clearly apparent.

Figure 2:
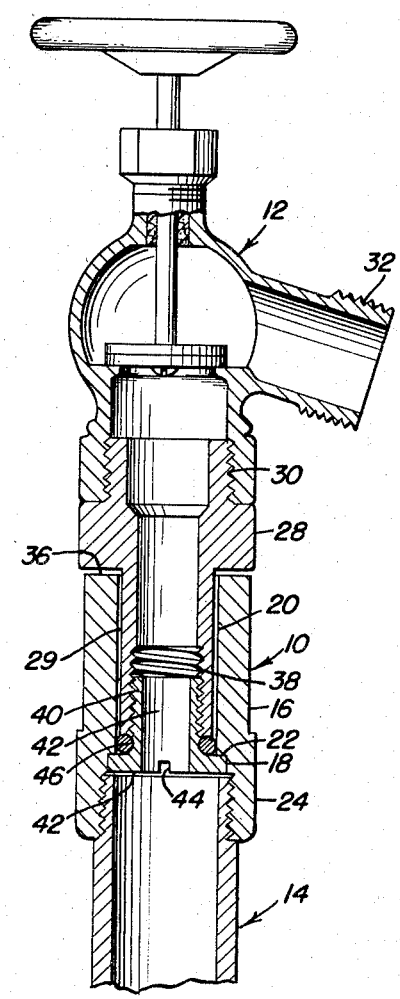
Figure 2 is a vertical cross sectional view thereof.
Figure 3:
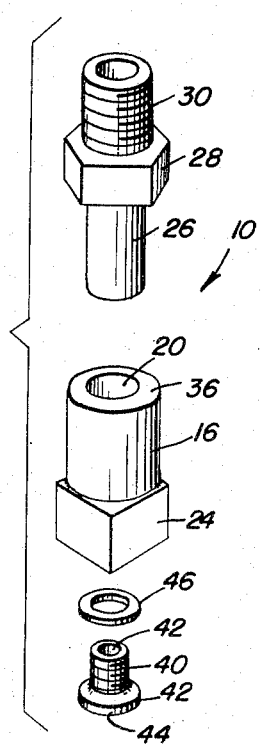
Figure 3 is a group perspective view showing some of the components of the invention.

The faucet 12 is, of course, provided with the usual screw-threaded adapter 32 so that a garden hose 34, or the like, may be connected thereto, and it is to be noted that the external flange or head 28 of the member 26 is engageable with the adjacent "small" end 36 of the sleeve 16, as is best shown in Figures 1 and 2.

On the other hand, the inner end of the member 26 is internally screw-threaded as at 38 to accommodate a connecting screw 40, the latter being provided with an axial passage 41 which extends between the interior of the member 26 and the relatively large bore 18 of the sleeve 16, and consequently, between the interior of the member 26 and the interior of the pipe 14, which is threaded into the bore portion 18.

The screw 40 is also equipped with an enlarged head 42 provided with a kerf 44 whereby the screw may be installed in the threaded portion 38 of the member 26, and an annular gasket or washer 46 is positioned on the screw 40, between the head 42 and the inner end of the member 26, as is best shown in Figure 2. It is to be noted that the head 42 of the screw 40 is in rotatable engagement with the shoulder 22 in the bore of the sleeve 16, thus facilitating rotation of the member 26 as well as of the associated faucet 12 relative to the pipe 14. However, after the screw 40 has been tightened sufficiently in the bore 38 of the member 26, the washer or gasket 46 is expanded laterally into frictional engagement with the inner surface of the portion 20 of the bore of the sleeve 16, thus assuring a leak-proof connection, notwithstanding the relative rotatability.

Needless to say, the head 42 of the screw 40 is maintained in frictional engagement with the shoulder 22 by the abutment of the flange or head 28 of the member 26 with the adjacent end surface 36 of the sleeve 16, as will be clearly understood.

It is believed that the advantages and use of the invention will be readily apparent from the foregoing disclosure and, accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a swivel pipe coupling, the combination of a connecting sleeve having a diametrically stepped bore to provide a large end, a small end and an annular shoulder therebetween, a substantially tubular connecting member rotatable in the small end portion of said bore and projecting outwardly therefrom, an external flange provided on the projecting portion of said member and engageable with the adjacent end of said sleeve, the inner end portion of said member being internally screw-threaded, a connecting screw engaging the screw-threaded end portion of said member and provided with an axial passage extending between the large end portion of said bore and the interior of said member, said screw having an enlarged head in frictional but rotatable engagement with said shoulder, and an annular washer positioned on said screw between said head and the inner end of said member, said washer frictionally and sealingly engaging the wall of the small end portion of said bore.

MARTIN SINNER.

REFERENCES CITED

The following references are of record in the file of this patent:

UNITED STATES PATENTS

| Number | Name | Date |
| --- | --- | --- |
| 611,442 | Vaughan | Sept. 27, 1898 |
| 1,574,855 | Vallier | Mar. 2, 1926 |